April 8, 1952     DU BOIS EASTMAN ET AL     2,591,687

PROCESS FOR THE MANUFACTURE OF SYNTHESIS GAS

Filed Jan. 17, 1947     2 SHEETS—SHEET 1

INVENTORS
DuBois EASTMAN
EVERETT M. BARBER
BLAKE REYNOLDS
BY
Daniel Stryker
ATTORNEY April 8, 1952     DU BOIS EASTMAN ET AL     2,591,687

PROCESS FOR THE MANUFACTURE OF SYNTHESIS GAS

Filed Jan. 17, 1947                      2 SHEETS—SHEET 2

Fig. 2.

INVENTORS
DU BOIS EASTMAN
EVERETT M. BARBER
BLAKE REYNOLDS
BY
Daniel Stryker
ATTORNEY Patented Apr. 8, 1952

2,591,687

UNITED STATES PATENT OFFICE 2,591,687

PROCESS FOR THE MANUFACTURE OF SYNTHESIS GAS

Du Bois Eastman, Scarsdale, Everett M. Barber, Wappinger Falls, N. Y., and Blake Reynolds, Montclair, N. J., assignors to The Texas Company, New York, N. Y., a corporation of Delaware Application January 17, 1947, Serial No. 722,742

5 Claims. (Cl. 48—196)

This invention relates to a process and apparatus for the preparation of synthesis gas for the synthesis of higher molecular weight hydrocarbons, oxygenated compounds and the like.

More particularly, the invention is directed to a method of and apparatus for preparing so-called synthesis gas, i. e., a mixture of carbon monoxide and hydrogen, by the controlled combustion of a carbon-containing material such as hydrocarbon gas or other hydrocarbons in liquid or solid form capable of being reacted with an oxygen-containing gas in an engine of the internal combustion type.

While it has been previously proposed to use internal combustion engines for the preparation of synthesis gas, there have been many objections to their use, the principal objection being the formation of excessive quantities of free carbon which render the product gases objectionable, foul the spark plugs, cause the rings to stick, contaminate the oil and soon render the engine inoperative. With the exception of the spark plug fouling, the same objections apply to engines of the diesel type.

In overcoming the aforesaid difficulties, it is an object of this invention to provide a novel method and apparatus wherein synthesis gas of a good quality can be produced by an internal combustion engine.

Another object of the invention is to provide a novel method of and apparatus for preparing synthesis gas by the use of an internal combustion engine wherein the formation of free carbon with its accompanying objections is substantially eliminated and a higher efficiency of production obtained.

A further object of the invention is the provision of novel apparatus including internal combustion engine for the preparation of synthesis gas wherein the power developed is directed to the necessary separation of oxygen and other treatment of the gases involved, the developed power being sufficient for such purposes so that from an energy standpoint, the system is self-sufficient.

Further objects and advantages of the invention will be apparent from the following description and claims taken in connection with the attached drawing wherein:

Figure 2 is a diagrammatic showing of a preferred arrangement of a number of combined engine and compressor units in a plant installation.

Figure 1:
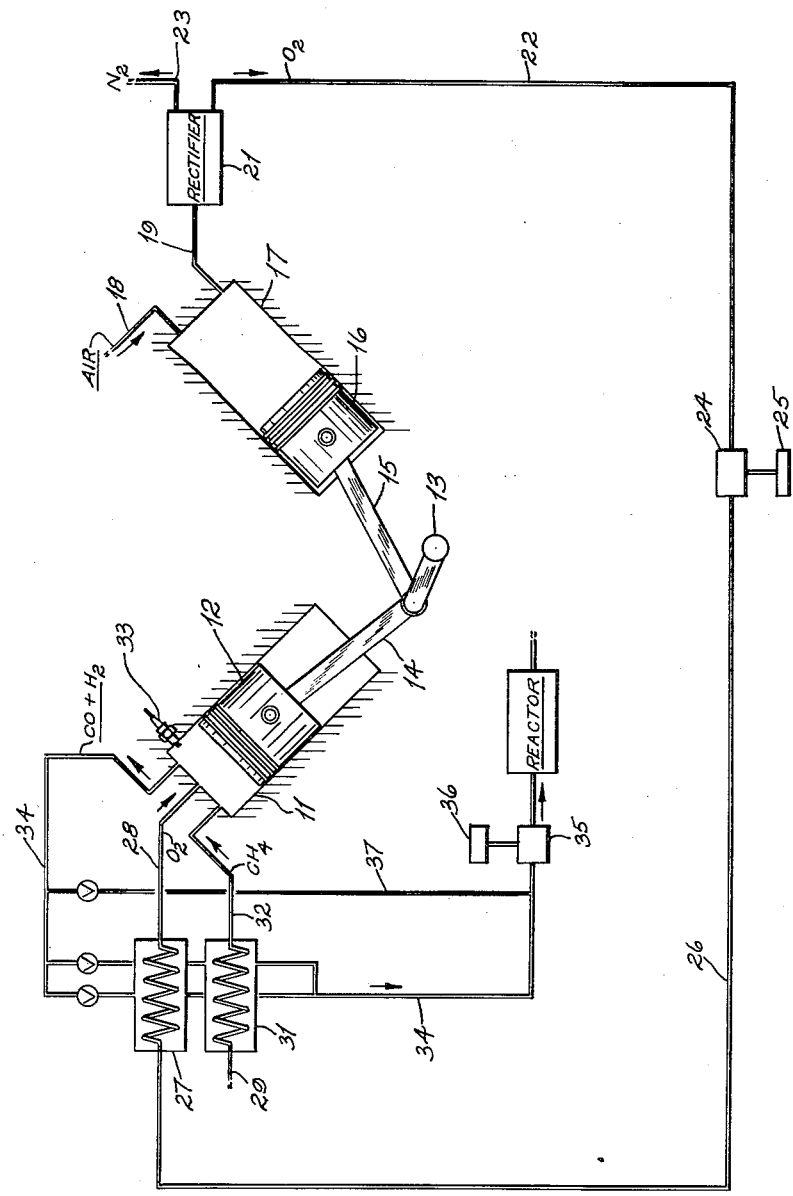
Figure 1 is a diagrammatic showing of the arrangement of a combined engine and compressor in a process for the preparation of synthesis gas.

In its broader aspect, the present invention resides in the discovery that certain factors, hitherto considered relatively unimportant, exist in definite relations to the production of synthesis gas in an internal combustion engine and must be considered in successfully practicing such a method. Such factors include the manner of feeding the reactants, the preheating of the reactants, the oxygen-carbon ratio in the feed, the intake and exhaust pressures, the intake and exhaust temperatures, the compression ratio, and others to be later discussed.

Separate feed of the reactants, as contrasted to the prior art practice of mixed feeds, has proved important in that it tends to eliminate backfiring and pre-ignition and enables higher preheating with consequent reactions of the reactants at a higher energy level.

Preheating, which determines the intake temperature for the internal combustion engine and applies alike to the carbon-containing material and oxygen-containing gas, the latter preferably containing from 90–99 per cent pure oxygen, has proven highly desirable. While some preheating can be accomplished with premixing of the reactants, the temperature of such preheating is definitely limited by the explosive characteristics of the mixture. By separately preheating the reactants with separate feeds thereof to the combustion zone of the internal combustion engine, the hydrocarbon, for example, methane, being preheated to a temperature in the order of 1000° F. and higher, preferably without cracking, and the oxygen to 800° F. or higher, danger of a backfire or flashback is substantially avoided. As an alternative, the oxygen may be divided into two streams, and oxygen in a proportion below the explosive limit at the preheat temperature, be preheated with the methane, the remaining oxygen being separately preheated.

With an internal combustion engine, the relatively short residence time or dwell of the eventual mixture prior to combustion substantially inhibits any tendency for pre-ignition, even at the relatively high preheating temperatures. A further advantage of the internal combustion engine in this respect over the conventional gas generator is found in the further preheating of the mixture in an amount of approximately 500–600° F., depending on the amount of initial preheat, compression ratio and other factors, by reason of the compression prior to combustion. This increase in temperature and the turbulence caused by the actual combustion insure a substantially complete reaction at a relatively high energy level, despite the relatively short residence time in the engine as compared to the residence time in a generator.

The oxygen-carbon ratio, (atomic ratio of total oxygen to total carbon in the feed), hereinafter designated as the O/C ratio, has been found to be highly important as regards the formation of free carbon and preignition, and has also been found to bear a definite relation to the intake pressure. For example, with a hydrocarbon such as natural gas and substantially pure oxygen, at an intake pressure of about 50 pounds per square inch gauge, an O/C ratio of about 1.28 is most satisfactory with a possible variation between about 1.15 and 1.40. Below 1.15, free carbon is deposited on the combustion surfaces as a fine-grained, soft, sooty layer in the order of 0.005 inch to 0.010 inch thick. While this layer does no harm to the chamber surfaces on which it collects, it tends to foul the spark plug. In other parts of the engine, the carbon has other deleterious effects. It causes the piston rings to stick and contaminates the crankcase oil beyond an operating limit.

The carbon also collects in the form of gummy masses around the exhaust valve assembly. At an intake pressure of about 50 pounds per square inch gauge and an O/C ratio in excess of 1.40, preignition occurs which seriously disturbs the operation of the engine. Depending on the intake pressure which preferably ranges between atmospheric and 100 pounds per square inch gauge, the O/C ratio can be varied within different limits as explained hereinafter.

A relatively low compression ratio in the internal combustion engine in the order of 3:1 to 5:1, preferably 3.5:1, has been found desirable since it permits higher intake pressures without developing excessive maximum pressures in the engine. A spark advance of about 15° BTC (before top center) giving a slight reduction in best power output, usually about 15% has been found most desirable. While the degree of spark advance can be adjusted to suit the requirements of the carbon-containing material being processed, it is preferred to retard the spark to hold the maximum pressure down. With corresponding adjustment of the O/C ratio, it has been found possible to vary the intake pressure of the oxygen-containing gas and the hydrocarbon, the two being admitted separately to the combustion chamber between atmospheric pressure and 100 pounds per square inch gauge, the optimum being about 50 pounds per square inch gauge. The exhaust may be varied within the order of one-half to twice the intake pressure but is preferably equal thereto. With a synthesis reactor requiring a feed of the synthesis gas at about 250 pounds per square inch gauge, the exhaust gases may be brought up to the desired pressure by a compressor, the power therefor being supplied by the generation of the synthesis gas in the internal combustion engine in the manner hereafter described.

Referring to the drawings, which, it is to be understood, are solely by way of illustration, Fig. 1 discloses a combined engine compressor wherein a power cylinder 11 contains a piston 12 connected to a crank shaft 13 by a connecting rod 14. The crank shaft is connected by a second rod 15 to a piston 16 in a compression cylinder 17 so that the power developed in cylinder 11 is made immediately and directly available to the compression cylinder 17.

Obviously other arrangements can be made such as a conventional engine having its crank shaft connected to a separate compressor or an engine having its crank shaft connected to a generator and the power generated thereby utilized to affect the electrical drive of one or more compressors, such other arrangements being understood to be within the scope of the invention. It is to be understood that both cylinders are supplied with the usual inlet and exhaust valves, cylinder 11 preferably having two inlet valves, one for the hydrocarbon and one for the oxygen-containing gas.

The inlet valve of cylinder 17 is positioned to control an air line 18, containing air at atmospheric pressure, and the exhaust valve to control a compressed air line 19 leading to a rectifier 21. The design of cylinder 17 is preferably such that the air is compressed to a pressure not in excess of 85 pounds per square inch gauge, this being sufficient to effect rectification of the air in rectifier 21, substantially pure oxygen in the order of 90–99 per cent being discharged through line 22 and nitrogen through line 23.

A line 22 leads to a compressor 24 driven by an engine 25 to raise the pressure of the oxygen from approximately atmospheric to as high as 100 pounds per square inch gauge, preferably 50 pounds per square inch gauge. Power for the operation of the compressor is preferably supplied by a power cylinder similar to cylinder 11 as will later be described. The compressed oxygen is conducted by line 26 to a preheater 27 and heated to a high temperature in the order of 800° F. or higher, the preheated gas being conducted by line 28, controlled by an intake valve, to cylinder 11. Preheater 27 may be heated by the exhaust gases from cylinder 11 as shown, temperature of such gases being in the order of 1500° F., by the burning of waste gases from a synthesis reaction, by the burning of natural gas, or by a combination of such methods. The synthesis gas issuing from the power cylinder is cooled as rapidly as possible by quench water or by heat exchange with water-containing tubes to prevent secondary reactions. In the latter case, the steam generated in such cooling can be employed in preheater 27.

The hydrocarbon, natural gas being selected by way of example, is usually available at the desired intake pressure and is conducted by line 29 to a preheater 31 where it is heated to as high a temperature as possible, preferably without cracking, and preferably in the order of 1000° F. The gas is conducted by line 32 at a pressure substantially equal to the pressure of the oxygen to cylinder 11, the entry thereof into the cylinder being controlled by a suitable inlet valve. Cylinder 11 contains a spark plug 33 and operates on the usual Otto cycle, the opening and closing of the two inlet valves and the exhaust valve, and the spark being controlled by suitable mechanism properly synchronized with the movement of the piston in well known manner.

The exhaust gas, essentially carbon monoxide and hydrogen, is taken off by line 34, any part of the heat thereof being utilized in preheaters 27 and 31, by the connection shown, as desired. If the gases be cooled as by a tubular heat exchanger, the steam generated by the cooling can be employed in the preheaters and supplemented by other heating means, if necessary.

The synthesis gas under a pressure in the range of atmospheric to 100 pounds per square inch gauge is brought up to a pressure of about 250 pounds per square inch gauge by a compressor 35 driven by an engine 36 in the same manner as compressor 24 and fed to a synthesis reactor.

To facilitate control of the preheating in the event that exhaust gas is used, a valve-controlled by-pass line 37 around the two preheaters may be provided.

With a standard Waukesha 3C CFR single cylinder engine having a bore of 3¼ inches by 4½ inches stroke, a speed of about 1000 R. P. M. (piston speed of 750 feet per minute), a compression ratio of about 3.5:1, a spark advance of about 15° BTC, intake temperature of about 400° F., and intake and exhaust pressures of about 50 pounds per square inch gauge, a feed of 99 per cent oxygen and natural gas of the following composition, is fed in an O/C ratio of about 1.28:

|  | Per cent |
|---|---|
| $CH_4$ | 83.6 |
| $C_2H_6$ | 10.2 |
| $C_3H_8$ | 4.5 |
| $C_4H_{10}$ (and heavier) | 0.1 |
| $CO_2$ | 1.0 |
| $N_2$ | 0.5 |
| $O_2$ | 0.1 |

Under such conditions, there is no flashback, spark plug fouling or preignition. Operation of the engine can be continued indefinitely dependent upon mechanical failures. The yield on a CO/O basis approximates 69–74 per cent; on a CO/C basis, about 90 per cent; on a $CO+H_2$ basis oxygen in total feed, 65–70 per cent; and $CO+H_2$ basis gas in total feed, 83 per cent; thus comparing favorably with yields obtained with conventional generators. A typical analysis of exhaust gas runs as follows:

|  | Per cent |
|---|---|
| $CO_2$ | 2.4 |
| $CO$ | 32.2 |
| $CH_4$ | 1.8 |
| $H_2$ | 52.9 |
| $H_2O$ | 9.8 |
| $N_2$ | 0.9 |

In addition to its conversion capacity, the power developed by the engine is available for use in the process, this feature constituting a marked advantage over a generator of substantially the same productive capacity as regards synthesis gas.

In Figure 2, illustrating a practical application of the engine-compressor unit in a gas generating process, a series of combined engine-compressor units 41 are shown, each engine having a series of power cylinders 11 and compressor cylinders 17. It is to be understood that each unit may be composed of any desired number of cylinders. The engine-compressor units may be of the conventional type such as the Clark BA 17 engine-compressor unit sold by Clark Brothers Company, Olean, New York, wherein the power cylinders have a stroke of 17 inches, the engines a speed of 350 R. P. M., the power cylinder a bore of 9 inches, an intake pressure of about 50 pounds per square inch gauge, and a permissible power output of 200 H. P. per cylinder. The compression cylinders can be designed to be of the capacities suitable to the purposes for which they are used. The hydrocarbon is fed through line 29, preheater 31 and line 32 to cylinders 11. The air is compressed in four of cylinders 17, preferably by two stages, conducted by line 19 to rectifier 21, and the resulting oxygen fed by line 22 to a compression cylinder 24 where it is brought to about 50 pounds per square inch gauge. The oxygen is then preheated at 27 and fed into the power cylinder through line 28. The synthesis gas, taken off through line 34, is fed into three compression cylinders 35, brought up to the desired pressure of about 250 pounds and fed to the synthesis reactor.

With such an arrangement, the H. P. developed by the engine can be fully utilized in a most efficient manner, the power balance being substantially even. Under the conditions noted above, and with a plant of the size described below, approximately 19,500 H. P. is required for compression of the air, about 3500 H. P. for the compression of the oxygen and about 14,500 H. P. for compression of the synthesis gas. Thus, the total requirements are about 37,500 H. P., whereas the power cylinders develop about 38,500 H. P.

While four of eight compressor units shown in Figure 2 are used for the compression of the air prior to rectification, one unit is used for the compression of oxygen and three units for the compression of synthesis gas, it is to be understood that the number of compressor units allotted to each function may vary dependent upon the temperatures and pressures of the gases handled. Further adjustment is possible by varying the capacity of the different compressors as already explained. Obviously, it may be desirable to allot certain of the compressor units to other functions in connection with other phases of the generating or the synthesizing processes such as the compression of the gas to be recycled to the synthesis reactor or to the power cylinders. With separate compressor units, it is evident that an exceedingly flexible compressing system is provided which can be readily arranged to suit the needs of the process.

As an illustration of the economic advantage of such an engine unit as compared to a conventional generator, with an assembly of 25 Clarke BA-17 engines with an oxygen feed of 48,400,000 s. c. f./d. (standard cubic feet per day) and a gas feed of 64,400,000 s. c. f./d., a yield of charge gas of 180,000,000 s. c. f./d. will be produced coupled with a production of power for all compressor units and an excess of about 270,000 pounds per hour of steam at 200° F. superheat and about 200 pounds per square inch gauge from the cooling of the exhaust gas from about 1500° F. to 600° F. A generator with the same productive capacity will have a steam deficiency of about 129,000 pounds per hour. Thus, the engine system produces excess power while the conventional generator system requires external power.

As already stated, it has been found that the O/C ratio is correlated to the intake pressure and that a definite relation must be maintained between the two. For instance, with natural gas and substantially pure oxygen at an intake pressure of 50 pounds per square inch gauge, the O/C ratio may be varied between approximately 1.15 and 1.40 without danger of excessive carbon formation or preignition. Below 50 pounds, the lower limit of the O/C ratio must be proportionately increased to about 1.29 at atmospheric pressure. The upper limit can be varied from 1.40 to 50 pounds per square inch gauge to about 1.50 at atmospheric. At a pressure of about 95 pounds per square inch gauge, it is possible to operate at an O/C ratio of about 1.0 to 1.28, the upper limit increasing to about 1.40 as the intake pressure is lowered to about 50 pounds per square inch gauge.

It will be appreciated that for different hydrocarbons, such as methane, fuel oil, kerosene, powdered coal, etc., the above-stated oxygen-carbon ratio will vary. However, in all cases the oxygen required is usually about 20 to 30 per cent in excess of that stoichiometrically required to react with the carbon content of the hydrocarbon or carbon-containing material employed to form carbon monoxide.

It will also be appreciated that the limits of operations as explained above will vary to some extent with engines of different types, the use of oxygen-containing gases of different oxygen contents, and the use of different types of carbon-containing materials.

Obviously many modifications and variations of the invention as above set forth may be made without departing from the spirit and scope thereof, and therefore only such limitations should be imposed as are indicated in the appended claims.

We claim:

1. In a process for the production of carbon monoxide and hydrogen by partial combustion in a cylinder of an internal combustion engine of a hydrocarbon fuel with an oxygen-containing gas containing at least 90 per cent oxygen by volume, the method which comprises introducing said fuel and said oxygen-containing gas to said engine at a pressure of at least 50 pounds per square inch gauge in an amount sufficient to substantially fill said cylinder at substantially said pressure and in relative proportions such that the ratio of atoms of oxygen to atoms of carbon in the resulting mixture is within the range of from about 1.0 to about 1.4, compressing the thus fed gas to no more than $\frac{1}{3}$ of the volume of the cylinder, igniting the thus compressed mixture, and discharging the resulting products from the engine at a pressure of at least 50 pounds per square inch gauge.

2. In a process for the production of carbon monoxide and hydrogen by the partial combustion in a cylinder of an internal combustion engine of a hydrocarbon fuel with substantially pure oxygen, the improvement which comprises introducing said carbonaceous fuel and oxygen to said engine at a pressure within the range of from about 50 to about 100 pounds per square inch gauge in an amount sufficient to substantially fill said cylinder at substantially said pressure, and in relative proportions such that the ratio of atoms of oxygen to atoms of carbon in the resulting mixture is within the range of about 1.0 to about 1.4, and falls within the limits defined by a minimum oxygen-to-carbon ratio of 1.0 to a maximum of 1.28 at 100 pounds per square inch gauge and a minimum of 1.15 to a maximum of 1.4 at 50 pounds per square inch gauge, compressing the thus fed gas to between $\frac{1}{3}$ to $\frac{1}{5}$ the volume of the cylinder, igniting the thus compressed mixture, and discharging the resulting products of partial combustion from said engine at a pressure within the range of from about 50 to about 100 pounds per square inch gauge.

3. In a process for the production of carbon monoxide and hydrogen by partial combustion of gaseous hydrocarbon fuel with an oxygen-containing gas containing at least 90 per cent oxygen by volume in a cylinder of an internal combustion engine, the method which comprises introducing said reactants into the cylinder of said engine at a pressure within the range of from about 50 to about 100 pounds per square inch gauge in an amount sufficient to substantially fill said cylinder at substantially said pressure and in relative proportions such that the ratio of atoms of oxygen to atoms of carbon in the mixture is within the range of from about 1.0 to 1.4, at least a portion of said oxygen being introduced separately from said fuel, compressing the thus fed gas to between $\frac{1}{3}$ and $\frac{1}{5}$ the volume of the cylinder, igniting the thus compressed mixture, and discharging the resulting products at a pressure within the range of from about 50 to about 100 pounds per square inch gauge.

4. A process as defined in claim 3 wherein the gaseous hydrocarbon fuel is preheated to a temperature above about 1000 F. and said preheated fuel and oxygen are separately introduced into the combustion zone of said engine.

5. In a process for the production of carbon monoxide and hydrogen by the partial combustion in a cylinder of an internal combustion engine of a gaseous hydrocarbon fuel containing chiefly methane with substantially pure oxygen, the improvement which comprises introducing said reactants into said engine at a pressure of about 50 pounds per square inch gauge in an amount sufficient to substantially fill said cylinder at substantially said pressure and in relative proportions such that the ratio of atoms of oxygen to atoms of carbon in the resulting mixture is within the range of from about 1.5 to about 1.40, compressing the thus fed gas to between $\frac{1}{3}$ and $\frac{1}{5}$ the volume of the cylinder, igniting the thus compressed mixture, and discharging resulting products of partial combustion from said engine at a pressure of at least 50 pounds per square inch gauge.

DU BOIS EASTMAN.
EVERETT M. BARBER.
BLAKE REYNOLDS.

REFERENCES CITED

The following references are of record in the file of this patent:

UNITED STATES PATENTS

| Number | Name | Date |
|---|---|---|
| 832,728 | Hayes | Oct. 9, 1906 |
| 905,433 | Johnston | Dec. 1, 1908 |
| 1,107,581 | Brownlee et al. | Aug. 18, 1914 |
| 1,107,582 | Brownlee et al. | Aug. 18, 1914 |
| 1,586,508 | Brutzkus | May 25, 1926 |
| 2,327,459 | Rice | Aug. 24, 1943 |
| 2,363,703 | Urquhart | Nov. 28, 1944 |